(12) United States Patent
Iizuka et al.

(10) Patent No.: US 12,117,550 B2
(45) Date of Patent: Oct. 15, 2024

(54) SENSOR AND POSITION ESTIMATION METHOD

(71) Applicant: Panasonic Intellectual Property Management Co., Ltd., Osaka (JP)

(72) Inventors: Shoichi Iizuka, Osaka (JP); Takeshi Nakayama, Hyogo (JP); Naoki Honma, Iwate (JP); Nobuyuki Shiraki, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 403 days.

(21) Appl. No.: 17/612,820

(22) PCT Filed: Dec. 28, 2020

(86) PCT No.: PCT/JP2020/049179
§ 371 (c)(1),
(2) Date: Nov. 19, 2021

(87) PCT Pub. No.: WO2021/140994
PCT Pub. Date: Jul. 15, 2021

(65) Prior Publication Data
US 2022/0221549 A1    Jul. 14, 2022

(30) Foreign Application Priority Data

Jan. 7, 2020   (JP) ................. 2020-000925

(51) Int. Cl.
*G01S 5/02*   (2010.01)
(52) U.S. Cl.
CPC ................. *G01S 5/0278* (2013.01)
(58) Field of Classification Search
None
See application file for complete search history.

(56) References Cited

U.S. PATENT DOCUMENTS

2008/0108314 A1*  5/2008  Mihota .............. H04B 7/0697
                                              455/101
2008/0204322 A1   8/2008  Oswald et al.
(Continued)

FOREIGN PATENT DOCUMENTS

| JP | 2007-155490 A | 6/2007 |
| JP | 2007-518968 A | 7/2007 |

(Continued)

OTHER PUBLICATIONS

Extended European Search Report dated May 19, 2023 issued in the corresponding European Patent Application No. 20911628.4.
(Continued)

*Primary Examiner* — Vladimir Magloire
*Assistant Examiner* — David C. Schultz
(74) *Attorney, Agent, or Firm* — Rimon P.C.

(57) ABSTRACT

A sensor includes: a living body component extractor that receives a signal transmitted from each transmitting station and influenced by a living body, and extracts a signal component influenced by the living body; a position spectrum function calculator that calculates as many position spectrum functions as the number of combinations of transmitting stations and receiving stations, the position spectrum functions each being calculated from the signal component and corresponding to a likelihood of a position of the living body; a weight function calculator that calculates as many weight functions as the number of combinations, the weight functions each representing reliability of a position spectrum function; an integrated position spectrum function calculator that outputs an integrated position spectrum function using the position spectrum functions and the weight functions; and a position estimator that estimates the position of the living body by detecting a maximum value from the integrated position spectrum function.

17 Claims, 8 Drawing Sheets

(56) References Cited

U.S. PATENT DOCUMENTS

| | | | |
|---|---|---|---|
| 2010/0027703 A1* | 2/2010 | Yeh | H04L 25/022 |
| | | | 375/267 |
| 2011/0045840 A1* | 2/2011 | Alizadeh-Shabdiz | ................. |
| | | | H04W 64/00 |
| | | | 455/456.1 |
| 2012/0162012 A1 | 6/2012 | Marzouki et al. | |
| 2017/0338874 A1* | 11/2017 | Pratt | H04B 7/0862 |
| 2018/0196131 A1* | 7/2018 | Iizuka | G01S 13/003 |
| 2019/0122514 A1* | 4/2019 | Olekas | G01S 7/006 |
| 2019/0239025 A1* | 8/2019 | Keal | H04W 4/021 |

FOREIGN PATENT DOCUMENTS

| | | |
|---|---|---|
| JP | 2008-170386 A | 7/2008 |
| JP | 2010-032442 A | 2/2010 |
| JP | 2010-249712 A | 11/2010 |
| JP | 2012-524898 A | 10/2012 |
| JP | 2015-117972 A | 6/2015 |
| JP | 2018-112539 A | 7/2018 |
| WO | 2005/045455 A2 | 5/2005 |
| WO | 2010/122370 A1 | 10/2010 |

OTHER PUBLICATIONS

International Search Report and Written Opinion issued on Mar. 16, 2021 in International Patent Application No. PCT/JP2020/049179; with partial English translation.

Nobuyuki Shiraki, et al., "Multi-Static MIMO Radar Using 2D Weight Function" (Mar. 3, 2020, ISSN:1349-1369, p. 153), Proceedings of the 2020 IEICE General Conference (Mar. 17-20, 2020) with partial English translation.

T. Miwa, et al., "Localization of Living-Bodies Using Single-Frequency Multistatic Doppler Radar System", IEICE Transactions on Communications, vol. E92-B, No. 7, pp. 2468-2476, Jul. 2009.

\* cited by examiner

SENSOR AND POSITION ESTIMATION METHOD

CROSS-REFERENCE OF RELATED APPLICATIONS

This application is the U.S. National Phase under 35 U.S.C. § 371 of International Patent Application No. PCT/JP2020/049179, filed on Dec. 28, 2020, which in turn claims the benefit of Japanese Application No. 2020-000925, filed on Jan. 7, 2020, the entire disclosures of which Applications are incorporated by reference herein.

TECHNICAL FIELD

The present disclosure relates to a sensor and a position estimation method, and particularly relates to a sensor and a position estimation method that perform position estimation for living bodies using wireless signals.

BACKGROUND ART

Techniques of detecting detection objects (i.e. objects to be detected) using wirelessly transmitted signals have been developed (for example, see Patent Literature (PTL) 1 and Non Patent Literature (NPL) 1).

PTL 1 discloses analyzing a component containing Doppler shift through use of a Fourier transform to enable recognition of the position and state of a person which is a detection object. NPL 1 discloses a technique of estimating the position of a detection object using a variation component extracted from propagation channel information and multiple signal classification (MUSIC) method.

CITATION LIST

Patent Literature

[PTL 1]
  Japanese Unexamined Patent Application Publication No. 2015-117972
[PTL 2]
  Japanese Unexamined Patent Application Publication No. 2010-249712
[PTL 3]
  Japanese Unexamined Patent Application Publication No. 2007-155490
[PTL 4]
  Japanese Unexamined Patent Application Publication No. 2010-32442
[PTL 5]
  Japanese Unexamined Patent Application Publication (Translation of PCT Application) No. 2007-518968
[PTL 6]
  Japanese Unexamined Patent Application Publication (Translation of PCT Application) No. 2012-524898
[PTL 7]
  Japanese Unexamined Patent Application Publication No. 2018-112539
[PTL 8]
  Japanese Unexamined Patent Application Publication No. 2008-170386

Non Patent Literature

[NPL 1]
  T. MIWA, S. OGIWARA, and Y. YAMAKOSHI, "Localization of Living-bodies using Single-frequency multistatic Doppler radar System," IEICE Transactions on Communications, Vol. E92-B, No. 7, pp. 20468-2476, July 2009.

SUMMARY OF INVENTION

Technical Problem

However, the respective techniques disclosed in PTL 1 and NPL 1 have the problem in that, for example in the case where a living body which is a detection object is stationary, the range in which the living body is detectable, i.e. the detection range, is narrow.

In view of such circumstances, the present disclosure has an object of providing a sensor and a position estimation method that can estimate the position of a living body in a wider range with high accuracy using a wireless signal.

Solution to Problem

A sensor according to an aspect of the present disclosure is a sensor including: one or more transmitting stations each including a transmission array antenna that transmits a signal; and one or more receiving stations each including a reception array antenna that receives a signal, the sensor including: a living body component extractor that receives, by the reception array antenna, a signal transmitted from each of the one or more transmitting stations and influenced by a living body, and extracts a signal component influenced by the living body from the signal received; a position spectrum function calculator that calculates as many position spectrum functions as a total number of combinations of the one or more transmitting stations and the one or more receiving stations, the position spectrum functions each being calculated from the signal component and corresponding to a likelihood of a position of the living body; a weight function calculator that calculates as many weight functions as the total number of the combinations of the one or more transmitting stations and the one or more receiving stations, the weight functions each representing reliability of a position spectrum function of a corresponding receiving station at each coordinate in a measurement range; an integrated position spectrum function calculator that outputs an integrated position spectrum function obtained using the position spectrum functions calculated by the position spectrum function calculator and the weight functions calculated by the weight function calculator; and a position estimator that estimates the position of the living body by detecting a maximum value from the integrated position spectrum function.

These general and specific aspects may be implemented using a system, a method, an integrated circuit, a computer program, or a computer-readable recording medium such as CD-ROM, or any combination of a system, a method, an integrated circuit, a computer program, and a recording medium.

Advantageous Effects of Invention

A sensor, etc. according to an aspect of the present disclosure can estimate the position of a living body in a wider range with high accuracy using a wireless signal.

DESCRIPTION OF EMBODIMENTS (Underlying Knowledge Forming Basis of the Present Disclosure)

Techniques of detecting detection objects using wirelessly transmitted signals have been developed (for example, see PTL 1 to PTL 6 and NPL 1).

For example, PTL 2 and PTL 3 each disclose a technique of calculating whether a physical object is present and the moving direction of the physical object using an ultra-wide band (UWB) wireless signal. More specifically, a UWB wireless signal is transmitted to a predetermined region, and a wireless signal reflected by a detection object is received by an array antenna. Using the Doppler effect, only a signal from a moving object is separated, and whether a moving object is present or the moving direction of the moving object is calculated from the separated signal.

For example, PTL 4 and PTL 5 each disclose a technique of calculating the direction or position of a transmitter by performing a direction-of-arrival estimation process, which is one of the array antenna signal processing techniques, on the difference in reception timing at which an antenna receives a UWB signal transmitted from the transmitter.

For example, PTL 6 discloses a technique of estimating the position of an object using a direction estimation algorithm such as MUSIC method. Specifically, a direction estimation algorithm such as MUSIC method is applied in each of a plurality of receiving stations that have received a signal transmitted from a transmitting station, and the results are integrated by multiplication or addition. Highly accurate direction estimation can thus be achieved.

However, as a result of conducting close examination, the inventors have learned that highly accurate living body position estimation cannot be achieved by the respective techniques disclosed in PTL 2 to PTL 6. In detail, with the respective methods disclosed in PTL 2 and PTL 3, whether a person is present is detectable, but the direction or position of the person cannot be estimated. The respective techniques disclosed in PTL 4 to PTL 6 are each a technique of estimating the position of a transmitter that emits radio waves, and are incapable of living body position estimation.

PTL 1 discloses a technique of analyzing a component containing Doppler shift through use of a Fourier transform to enable recognition of the position and state of a person which is a detection object. NPL 1 discloses a technique of estimating the position of a detection object using a variation component extracted from propagation channel information and MUSIC method.

More specifically, with the respective techniques disclosed in PTL 1 and NPL 1, a propagation channel between transmitting and receiving antennas is observed, and its time-series changes are recorded. The propagation channel observed in a time series is then subjected to Fourier transform processing, to convert a time response into a frequency response. Since there are a plurality of transmitting antennas and a plurality of receiving antennas, the frequency response is expressed as a matrix whose elements are complex numbers. By applying a direction or position estimation algorithm such as MUSIC method to this frequency response matrix, the direction or position of an object can be determined. PTL 1 also states that a plurality of objects can be detected simultaneously.

However, the respective techniques disclosed in PTL 1 and NPL 1 have the problem in that, in a situation in which the Doppler effect is extremely weak such as when a living body which is a detection object is stationary, the detectable distance is short, and therefore the detection range in which the living body is detectable is narrow. This is because, in a situation in which the Doppler effect is extremely weak, influential factors such as the receiver's internal noise, interference waves coming from entities other than the detection object, and the presence of any physical objects that cause Doppler shift other than the detection object make it difficult to detect a Doppler shifted weak signal. Here, if a living body as the detection object carries a special device such as a transmitter, the living body can be detected even when it is stationary.

PTL 7 discloses a technique of estimating the position of a living body using a direction estimation algorithm such as MUSIC method. Specifically, a plurality of receiving stations each receive reflected waves resulting from a living body reflecting a signal transmitted from a transmitting station. In each receiving station, a variation component containing Doppler shift by the living body is extracted from the reception signal, and subjected to a direction estimation algorithm such as MUSIC method. The results are integrated by multiplication or addition. Highly accurate direction estimation can thus be achieved.

However, the technique disclosed in PTL 7 has the problem in that a virtual image from which a living body position is estimated tends to occur in a location where no living body is actually present. In a region near the transmitting station and the receiving station, the reflected waves by the living body can be observed strongly, so that the estimation result is highly reliable. In a region farther from the transmitting station and the receiving station, however, the reliability is lower. Such a result of low reliability is contained in the integrated results because the results of all receiving stations are treated with the same weight in the integration.

PTL 8 discloses a technique of using a value obtained from the relative position between each sensor and an object, as a weight in integration which is not used in the technique disclosed in PTL 7. Specifically, a result of a sensor nearer the object is given a larger weight because it has high reliability, and a result of a sensor farther from the object is given a smaller weight so as to be reflected less in the integrated results.

However, with the technique disclosed in PTL 8, proper integration cannot be performed in the case where a plurality of objects are present in the detection range. This is because whether objects detected by the sensors are the same or different cannot be determined, and the objects can only be treated as one object in the integration.

In view of the above, the inventors have conceived a sensor, etc. that can estimate the position of a living body as an object in a wider range with high accuracy using a wireless signal, with no need for the living body to carry a special device such as a transmitter.

A sensor according to an aspect of the present disclosure is a sensor including: one or more transmitting stations each including a transmission array antenna that transmits a signal; and one or more receiving stations each including a reception array antenna that receives a signal, the sensor including: a living body component extractor that receives, by the reception array antenna, a signal transmitted from each of the one or more transmitting stations and influenced by a living body, and extracts a signal component influenced by the living body from the signal received; a position spectrum function calculator that calculates as many position spectrum functions as a total number of combinations of the one or more transmitting stations and the one or more receiving stations, the position spectrum functions each being calculated from the signal component and corresponding to a likelihood of a position of the living body; a weight function calculator that calculates as many weight functions as the total number of the combinations of the one or more transmitting stations and the one or more receiving stations, the weight functions each representing reliability of a position spectrum function of a corresponding receiving station at each coordinate in a measurement range; an integrated position spectrum function calculator that outputs an integrated position spectrum function obtained using the position spectrum functions calculated by the position spectrum function calculator and the weight functions calculated by the weight function calculator; and a position estimator that estimates the position of the living body by detecting a maximum value from the integrated position spectrum function.

With this structure, position spectrum functions obtained from complex transfer functions calculated by a plurality of receiving stations are integrated using weights based on the positions of the transmitting stations and the receiving stations to perform estimation, so that the position of a living body can be estimated in a wider range with high accuracy using a wireless signal. In a region near the transmitting station and the receiving station, the reflected waves by the living body can be observed strongly, so that the estimation result is highly reliable. In a region farther from the transmitting station and the receiving station, however, the reliability is lower. In view of this, a position spectrum function obtained from a complex transfer function in a receiving station nearer the living body is given a larger weight, with it being possible to accurately estimate the position of the living body.

For example, the number of transmitting stations and/or the number of receiving stations may be two or more. In the case where the number of transmitting stations is two or more, their transmission timings or transmission frequencies may be controlled to not overlap with each other. A weight function and a position spectrum function may be integrated by multiplication or addition. The position spectrum function may be calculated using multiple signal classification (MUSIC) algorithm.

For example, the one or more transmitting stations may comprise two or more transmitting stations, or the one or more receiving stations may comprise two or more receiving stations.

For example, the one or more transmitting stations may comprise two or more transmitting stations, and the one or more receiving stations may comprise two or more receiving stations.

For example, the weight function calculator may calculate each of the weight functions based on a positional relationship among the coordinate, the transmission array antenna, and the reception array antenna.

For example, the weight function calculator may calculate a Rayleigh distribution or a normal distribution as each of the weight functions.

For example, the one or more transmitting stations may comprise two or more transmitting stations that control transmission timings or transmission frequencies to avoid simultaneous transmission from respective transmission array antennas.

For example, the integrated position spectrum function calculator may multiply or add the position spectrum functions and the weight functions to integrate the position spectrum functions and the weight functions into one function.

For example, the position spectrum function calculator may calculate the position spectrum functions based on a multiple signal classification (MUSIC) algorithm, a Capon algorithm, or a beamforming algorithm.

A position estimation method according to an aspect of the present disclosure is a position estimation method executed by a sensor that includes: one or more transmitting stations each including a transmission array antenna that transmits a signal; and one or more receiving stations each including a reception array antenna that receives a signal, the position estimation method including: receiving, by the reception array antenna, a signal transmitted from each of the one or more transmitting stations and influenced by a living body, and extracting a signal component influenced by the living body from the signal received; calculating as many position spectrum functions as a total number of combinations of the one or more transmitting stations and the one or more receiving stations, the position spectrum functions each being calculated from the signal component and corresponding to a likelihood of a position of the living body; calculating as many weight functions as the total number of the combinations of the one or more transmitting stations and the one or more receiving stations, the weight functions each representing reliability of a position spectrum function of a corresponding receiving station at each coordinate in a measurement range; outputting an integrated position spectrum function obtained using the position spectrum functions calculated and the weight functions calculated; and estimating the position of the living body by detecting a maximum value from the integrated position spectrum function.

The present disclosure can be implemented not only as a device, but also as an integrated circuit including processing means in the device, a method including steps performed by the processing means in the device, a program causing a computer to execute the steps, and information, data, or signals indicating the program. The program, information, data, and signals can be distributed by a recording medium such as a Compact Disc-Read Only Memory (CD-ROM) or a communication medium such as the Internet.

Embodiments of the present disclosure will be described in detail below, with reference to the drawings. The embodiments described below each show a preferred specific example according to the present disclosure. The numerical values, shapes, materials, structural elements, the arrangement and connection of the structural elements, steps, the processing order of the steps etc. shown in the following embodiments are mere examples, and do not limit the scope of the present disclosure.

Of the structural elements in the embodiments described below, the structural elements not recited in any one of the independent claims representing the broadest concepts according to the present disclosure are described as optional structural elements that may be included in preferred embodiments. In the description and the drawings, structural elements having substantially same functions and structures are given the same reference marks and their repeated description is omitted.

Embodiment

A position estimation method by sensor 1, etc. in an embodiment will be described below, with reference to the drawings.

[Structure of Sensor 1]

Figure 1:
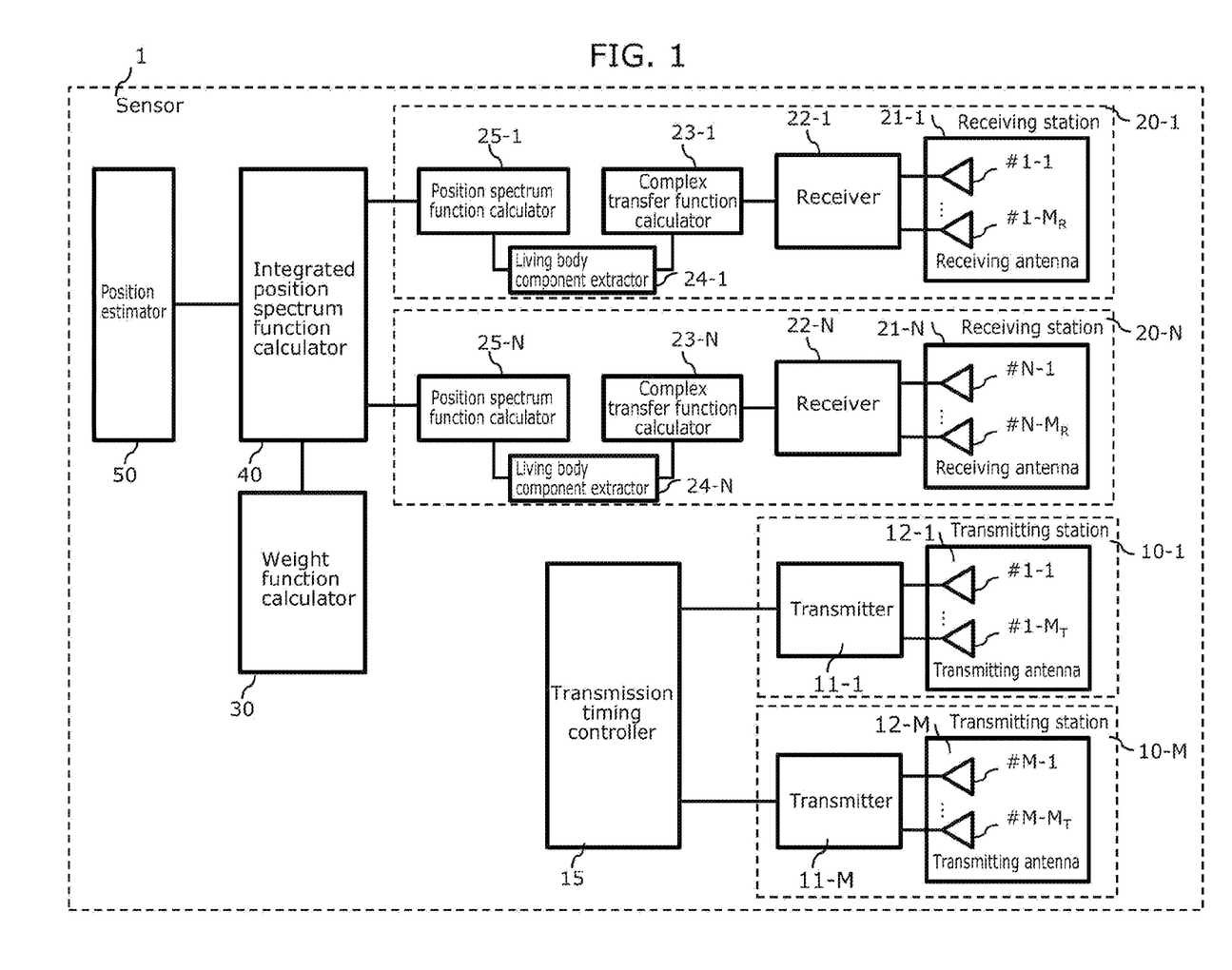
FIG. 1 is a block diagram illustrating a structure of a sensor in an embodiment.
Figure 2:
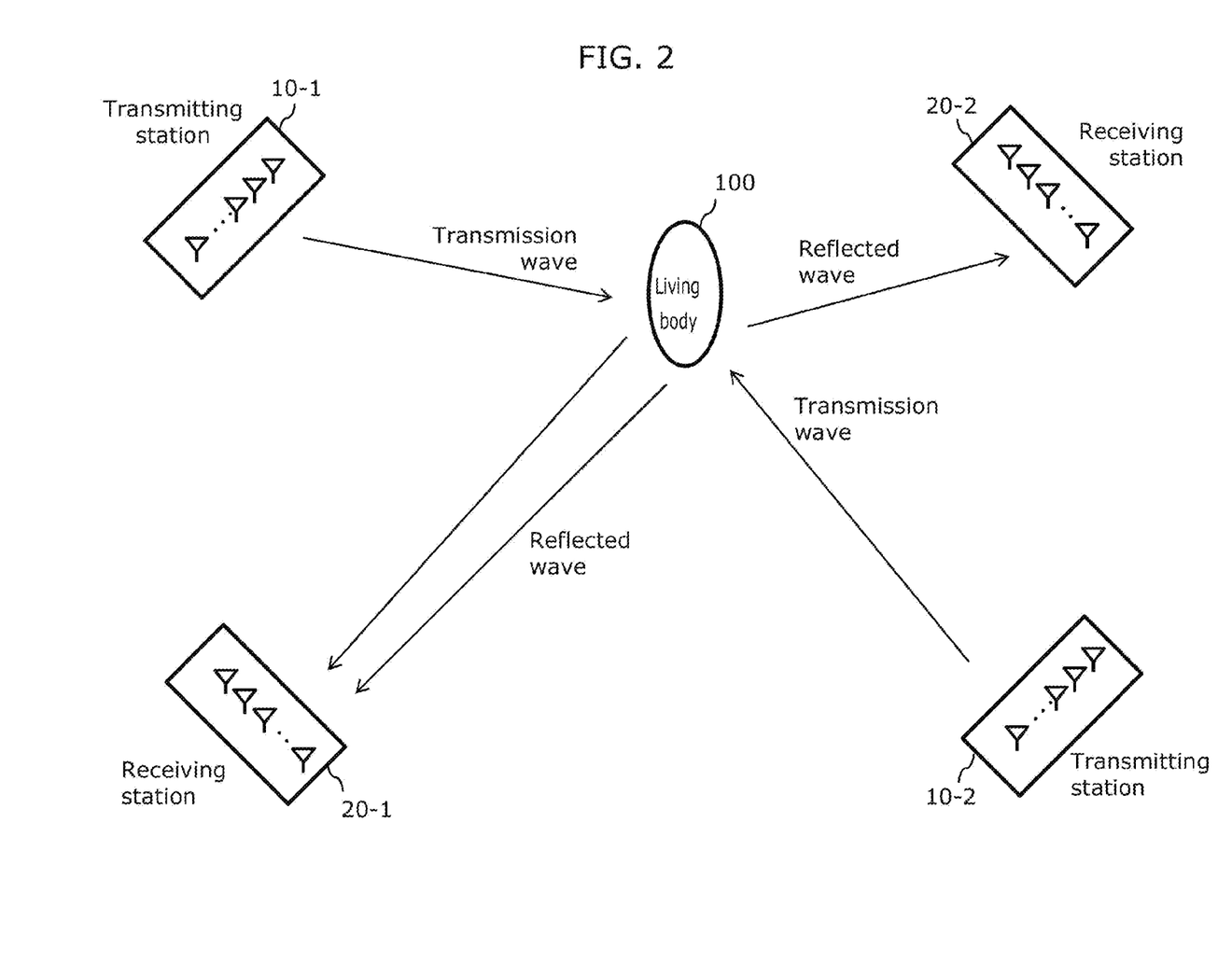
FIG. 2 is a diagram illustrating an example of arrangement of transmitting stations and receiving stations in the embodiment.

FIG. 1 is a block diagram illustrating a structure of sensor 1 in the embodiment. FIG. 2 is a diagram illustrating an example of arrangement of transmitting stations and receiving stations in the embodiment.

Sensor 1 illustrated in FIG. 1 includes M transmitting stations 10-1 to 10-M, transmission timing controller 15, N receiving stations 20-1 to 20-N, weight function calculator 30, integrated position spectrum function calculator 40, and position estimator 50. FIG. 2 schematically illustrates arrangement of transmitting stations 10-1 and 10-2 and receiving stations 20-1 and 20-2 in the case where M is 2 and N is 2, and how signal are transferred.

[Transmitting Stations 10-1 to 10-M]

Transmitting stations 10-1 to 10-M each include a transmission array antenna, where M is an integer greater than or equal to 1. As a representative example of the M transmitting stations, jth (j is an integer greater than or equal to 1 and less than or equal to M) transmitting station 10-$j$ will be described below. All transmitting stations 10-1 to 10-M have the same structure and perform the same processes.

Transmitting station 10-$j$ includes transmitter 11-$j$ and transmitting antenna 12-$j$, as illustrated in FIG. 1. Transmitter 11-$j$ is controlled by transmission timing controller 15 so as not to transmit transmission waves simultaneously with another transmitting station.

[Transmission Timing Controller 15]

Transmission timing controller 15 controls the transmission timings of two or more transmitting stations 10-1 to 10-M so that transmitting stations 10-1 to 10-M will not simultaneously transmit transmission waves from their transmission array antennas. Alternatively, transmission timing controller 15 may assign different frequencies to transmitting stations 10-1 to 10-M instead of controlling the transmission timings or, when antennas with limited directivity are used in a sufficiently wide space, allow sufficiently separated antennas to transmit transmission waves simultaneously, as long as the transmission signals of the transmitter is distinguishable. Moreover, time-division multiplexing or frequency multiplexing, carrier sense multiple access with collision avoidance (CSMA/CA), carrier sense multiple access with collision detection (CSMA/CD), and the like may be used as in wireless communication such as a local area network (LAN).

Transmitting antenna 12-$j$ is a transmitting antenna of $M_T$ elements, i.e. is composed of $M_T$ transmitting antenna elements.

Transmitter 11-$j$ generates a high-frequency (e.g. microwave) signal (e.g. continuous wave (CW) or orthogonal frequency division multiplexing (OFDM) signal) used to estimate the position of living body 100. For example, transmitter 11-$j$ transmits a generated signal from transmitting antenna 12-$j$ as transmission waves, as illustrated in FIG. 2.

[Receiving Stations 20-1 to 20-N]

Receiving stations 20-1 to 20-N each include a reception array antenna, where N is an integer greater than or equal to 2. As a representative example of the N receiving stations, ith (i is an integer greater than or equal to 1 and less than or equal to N) receiving station 20-$i$ will be described below. All receiving stations 20-1 to 20-N have the same structure and perform the same processes.

Receiving station 20-$i$ includes receiving antenna 21-$i$, receiver 22-$i$, complex transfer function calculator 23-$i$, living body component extractor 24-$i$, and position spectrum function calculator 25-$i$.

<Receiving Antenna 21-$i$>

Receiving antenna 21-$i$ is a receiving antenna of $M_R$ elements, i.e. a reception array antenna composed of $M_R$ receiving antenna elements. Receiving antenna 21-$i$ receives a high-frequency (e.g. microwave) signal (e.g. CW or OFDM signal) by the reception array antenna. In this embodiment, the high-frequency signal received by receiving antenna 21-$i$ may contain reflected waves that are a signal resulting from living body 100 reflecting part of the transmission waves transmitted from transmitting antenna 12-$j$ depending on the arrangement, for example as illustrated in FIG. 2.

<Receiver 22-$i$>

Receiver 22-$i$ converts the high-frequency signal received by receiving antenna 21-$i$ into a low-frequency signal which is signal-processable. Receiver 22-$i$ transfers the obtained low-frequency signal to complex transfer function calculator 23-$i$.

<Complex Transfer Function Calculator 23-$i$>

Complex transfer function calculator 23-$i$ calculates, from the signal observed by the reception array antenna in receiving station 20-$i$, a complex transfer function representing the propagation characteristics between the reception array antenna and transmitting antenna 12-$j$ in transmitting station 10-$j$. More specifically, complex transfer function calculator 23-$i$ calculates a complex transfer function representing the propagation characteristics between one transmitting antenna element in transmitting antenna 12-$j$ and $M_R$ receiving antenna elements in the reception array antenna, from the low-frequency signal transferred from receiver 22-$i$. Note that the complex transfer function calculated by complex transfer function calculator 23-$i$ contains reflected waves not via living body 100, such as direct waves and fixed object-derived reflected waves from transmitting antenna 12-$j$.

The complex transfer function calculated by complex transfer function calculator 23-$i$ may contain reflected waves that are a signal resulting from living body 100 reflecting part of the transmission waves transmitted from transmitting antenna 12-$j$. The amplitude and phase of the reflected waves reflected by living body 100, i.e. the reflected waves via living body 100, vary constantly due to the biological activities of living body 100 such as breathing and heartbeat.

It is assumed hereafter that the complex transfer function calculated by complex transfer function calculator 23-*i* contains reflected waves that are a signal reflected by living body 100.

<Living Body Component Extractor 24-*i*>

Living body component extractor 24-*i* extracts, from the signal observed by the reception array antenna in receiving station 22-*i*, a living body component which is a signal component transmitted from transmitting antenna 12-*j* and reflected by at least one living body 100. More specifically, living body component extractor 24-*i* records the complex transfer function calculated by complex transfer function calculator 23-*i*, in a time series, i.e. in chronological order in which signals are observed. Living body component extractor 24-*i* then extracts a variation component due to the influence of living body 100 from the changes in the complex transfer function recorded in a time series, as a living body component.

Examples of methods of extracting the variation component due to the influence of the living body include: a method whereby, after conversion into a frequency region by a Fourier transform or the like, only a component corresponding to vibration of the living body is extracted; and a method whereby the difference in complex transfer function between two different times is calculated to extract the variation component. With such methods, a complex transfer function component of direct waves and reflected waves via a fixed object is removed and only a complex transfer function component of reflected waves via living body 100 remains.

In this embodiment, the number of receiving antenna elements constituting the reception array antenna is $M_R$, i.e. two or more, and therefore the number of variation components via living body 100 of the complex transfer function corresponding to the reception array antenna, i.e. the number of living body components, is two or more. These are hereafter collectively referred to as a living body component channel matrix.

<Position Spectrum Function Calculator 25-*i*>

Position spectrum function calculator 25-*i* calculates a position spectrum function which is an evaluation function for the position of at least one living body 100 as seen from receiving station 20-*i*, from the living body component extracted by living body component extractor 24-*i*. For example, position spectrum function calculator 25-*i* may calculate the position spectrum function based on MUSIC algorithm.

In this embodiment, position spectrum function calculator 25-*i* calculates correlation matrix $R_{i,j}$ of a living body component channel vector obtained by vectorizing the living body component channel matrix extracted by living body component extractor 24-*i*, and, using obtained correlation matrix $R_{i,j}$, calculates position spectrum function $P_{i,j}(X)$ for position X of living body 100 as seen from receiving station 20-*i* by a predetermined direction-of-arrival estimation technique.

Position spectrum function calculator 25-*i* transfers calculated position spectrum function $P_{i,j}(X)$ to integrated position spectrum function calculator 40.

A procedure by which position spectrum function calculator 25-*i* calculates position spectrum function $P_{i,j}(X)$ using MUSIC method will be described below, using formulas. It is assumed here that the living body components are extracted using a Fourier transform.

Living body component channel matrix H(f) which is a $M_R \times M_T$ matrix can be represented by (Formula 1). This living body component channel vector is converted into a $M_R M_T \times 1$ living body component channel vector according to (Formula 2).

[Math. 1]
$$H(f) = \begin{pmatrix} h_{11}(f) & \cdots & h_{1M_T}(f) \\ \vdots & \ddots & \vdots \\ h_{M_R 1}(f) & \cdots & h_{M_R M_T}(f) \end{pmatrix}. \quad \text{(Formula 1)}$$

[Math. 2]
$$h(f) = [h_{11}(f) \ \cdots \ h_{M_R 1}(f) \ \cdots \ h_{M_R M_T}(f)]^T. \quad \text{(Formula 2)}$$

Here, $[\bullet]T$ denotes matrix transpose.

Correlation matrix $R_i$ of the living body component channel vector thus obtained is calculated according to (Formula 3).

[Math. 3]
$$R_i = E[h(f)h(f)^H](f_1 \le f \le f_2). \quad \text{(Formula 3)}$$

Here, $E[\bullet]$ denotes frequency direction averaging, where f1 and f2 are respectively lower-limit frequency and upper-limit frequency beyond which the influence of the biological activities appear.

Eigenvalue decomposition of correlation matrix $R_i$ of the living body component channel vector thus obtained can be expressed as the following (Formula 4) to (Formula 6).

[Math. 4]
$$R_{i,j} = U_i \Lambda_i U_i^H. \quad \text{(Formula 4)}$$

[Math. 5]
$$U_{i,j} = [u_1 \ \cdots \ u_L \ u_{L+1} \ \cdots \ u_{M_R M_T}]. \quad \text{(Formula 5)}$$

[Math. 6]
$$\Lambda_{i,j} = \text{diag}[\lambda_1 \ \cdots \ \lambda_L \ \lambda_{L+1} \ \cdots \ \lambda_{M_R M_T}]. \quad \text{(Formula 6)}$$

Here, $[\bullet]H$ denotes complex conjugate transpose, Ui is an eigenvector having $M_R \times M_T$ elements, $\Lambda_{i,j}$ is an eigenvalue corresponding to the eigenvector, and the following order is assumed:

[Math. 7]
$$\lambda_1 \ge \cdots \ge \lambda_L \ge \lambda_{L+1} \ge \ \cdots \lambda_{M_R M_T},$$

where L is the number of incoming waves, i.e. the number of living bodies that are detection objects.

The steering vector, i.e. the direction vector, of the reception array antenna can be defined by (Formula 7).

[Math. 8]

$$a_r(\theta) = [1, e^{-jkd\sin\theta}, \ldots, e^{-jkd(M_R-1)\sin\theta}]^T. \quad \text{(Formula 7)}$$

Here, k is the wave number, and d is the element interval of the reception array antenna. Likewise, the steering vector of the transmission array antenna can be defined by (Formula 8).

[Math. 9]

$$a_t(\theta) = [1, e^{-jkd\sin\theta}, \ldots, e^{-jkd(M_T-1)\sin\theta}]^T. \quad \text{(Formula 8)}$$

Further, the steering vectors of transmission and reception are multiplied, and a steering vector that takes into account angular information of both transmission and reception is defined as indicated in (Formula 9).

[Math. 10]

$$a(X) = vec\{a_t(\Theta_t(X))a_r^T(\Theta_r(X))\}. \quad \text{(Formula 9)}$$

Here, X is the coordinate of a point in the measurement range of the sensor, functions $\Theta t$ and $\Theta r$ are respectively a function for obtaining the angle between coordinate X and transmitting antenna 12-$j$ and a function for obtaining the angle between coordinate X and receiving antenna 21-$i$, and vec[•] is conversion of a matrix of M rows and N columns into a vector of M×N elements. Although an equal-interval array antenna is used in this example, the steering vector of any other array antenna can be equally calculated from element arrangement information. Moreover, actually measured values may be used instead of calculated values.

With MUSIC method, position spectrum function $P_{i,j}(X)$ is calculated using the steering vector as indicated in (Formula 10).

[Math. 11]

$$P_{i,j}(X) = \frac{1}{|a^H(X)[u_{L+1}, \ldots, u_{M_R M_T}]|^2}. \quad \text{(Formula 10)}$$

Position spectrum function $P_{i,j}(X)$ has the smallest denominator and takes a maximum value at the position of the living body as seen from jth transmitting station 10-$j$ and ith receiving station 20-$i$.

The position spectrum function may be calculated using not MUSIC method but beamforming method or Capon method.

[Weight Function Calculator 30]

Weight function calculator 30 calculates weight function $f(d_{i,j})$ for the combination of transmitting station 10-$j$ and receiving station 20-$i$. Here, $d_{i,j}$ is a value obtained by subtracting the distance between the transmitting antenna and the receiving antenna from the sum of the distance between position X and the transmitting antenna and the distance between position X and the receiving antenna. Function f is a weight function representing the reliability of position spectrum function $P_{i,j}(X)$ measured by the combination of transmitting station 10-$j$ and receiving station 20-$i$ for position X, and is basically closer to "1" when position X is nearer the transmitting antenna and the receiving antenna and closer to "0" when position X is farther from the transmitting antenna and the receiving antenna. For the weight function, for example, a Rayleigh distribution represented by (Formula 11) or a normal distribution represented by (Formula 12) is used.

[Math. 12]

$$f(x) = \frac{x}{\sigma^2}\exp\left(-\frac{x^2}{2\sigma^2}\right). \quad \text{(Formula 11)}$$

[Math. 13]

$$f(x) = \frac{1}{\sqrt{2\pi\sigma^2}}\exp\left(-\frac{(x-\mu)^2}{2\sigma^2}\right). \quad \text{(Formula 12)}$$

Figure 3:
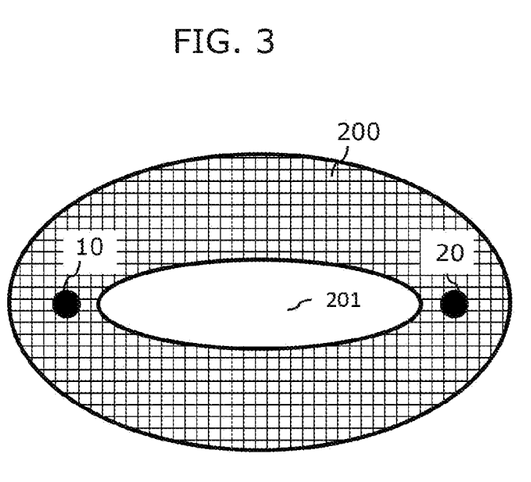
FIG. 3 is a diagram illustrating an example of a weight function using a Rayleigh distribution in the embodiment.
Figure 4:
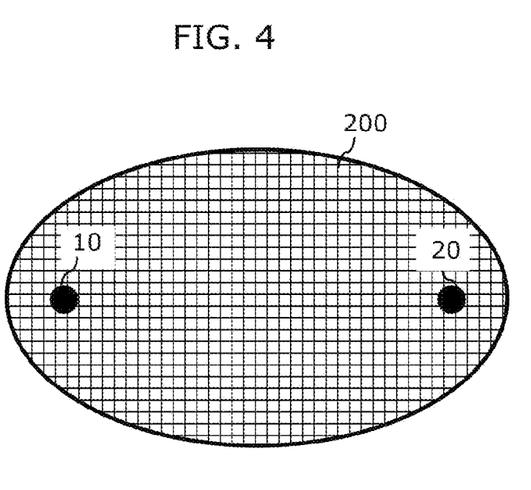
FIG. 4 is a diagram illustrating an example of a weight function using a normal distribution in the embodiment.

FIG. 3 is a schematic diagram illustrating a weight function using a Rayleigh distribution. Hatched region 200 is a region in which the value of the weight function is greater than a given value, that is, a region having high measurement result reliability. Regions near transmitting antenna 10 and receiving antenna 20 basically have a high weight function value, but region 201 on a straight line connecting transmitting antenna 10 and receiving antenna 20 has a low weight function value. This is because, on this straight line, the angle between the straight line connecting the transmitting antenna and the receiving antenna and a straight line connecting the transmitting antenna and a living body present in region 201 is small and the measurement accuracy is low. FIG. 4 is a schematic diagram illustrating a weight function using a normal distribution.

[Integrated Position Spectrum Function Calculator 40]

Integrated position spectrum function calculator 40 receives the (N×M) position spectrum functions calculated by N position spectrum function calculators 25-1 to 25-N and the weight functions calculated by weight function calculator 30. Integrated position spectrum function calculator 40 integrates the plurality of position spectrum functions calculated by position spectrum function calculators 25-1 to 25-N into one function. Here, integrated position spectrum function calculator 40 integrates the calculated plurality of position spectrum functions into one function by multiplication or addition, based on the weight functions calculated from the position of each transmitting antenna and receiving antenna.

In this embodiment, integrated position spectrum function calculator 40 integrates (N×M) position spectrum functions $P_{i,j}(X)$. More specifically, integrated position spectrum function calculator 40 obtains position spectrum functions $P_{i,j}(X)$ calculated using, for example, (Formula 10), from N receiving stations 20-1 to 20-N. Integrated position spectrum function calculator 40 then calculates position spectrum function $P_{all}(X)$ by integrating obtained N×M position spectrum functions $P_{i,j}(X)$ using (Formula 13).

[Math. 14]

$$P_{all}(X) = \frac{1}{\sum_{i=1}^{N}\sum_{j=1}^{M}\frac{f(d_{i,j})}{P_{i,j}(X)}}. \quad \text{(Formula 13)}$$

As a result of multiplying position spectrum functions $P_{i,j}(X)$ by the weight functions and calculating their sum total, only position spectrum functions having high reliability can be extracted and integrated.

Each position spectrum function $P_{i,j}(X)$ takes a maximum value at the angle of living body 100 with respect to corresponding receiving station 20-$i$, but is not 0 even at the other angles including directions outside the measurement range. By multiplying N×M position spectrum functions, an evaluation function reflecting the results of all N×M combinations of transmitting stations and receiving stations, i.e. position spectrum function $P_{all}(X)$ integrating the results, can be obtained. Note that the position spectrum functions may be integrated using multiplication or summation.

[Position Estimator 50]

Position estimator 50 searches for the maximum value of integrated position spectrum function $P_{all}(X)$ calculated by integrated position spectrum function calculator 40, to estimate the position of living body 100 in the direction of the incoming waves.

[Operation of Sensor 1]

A process of estimating the position of a living body by sensor 1 having the above-described structure will be described below.

Figure 5:
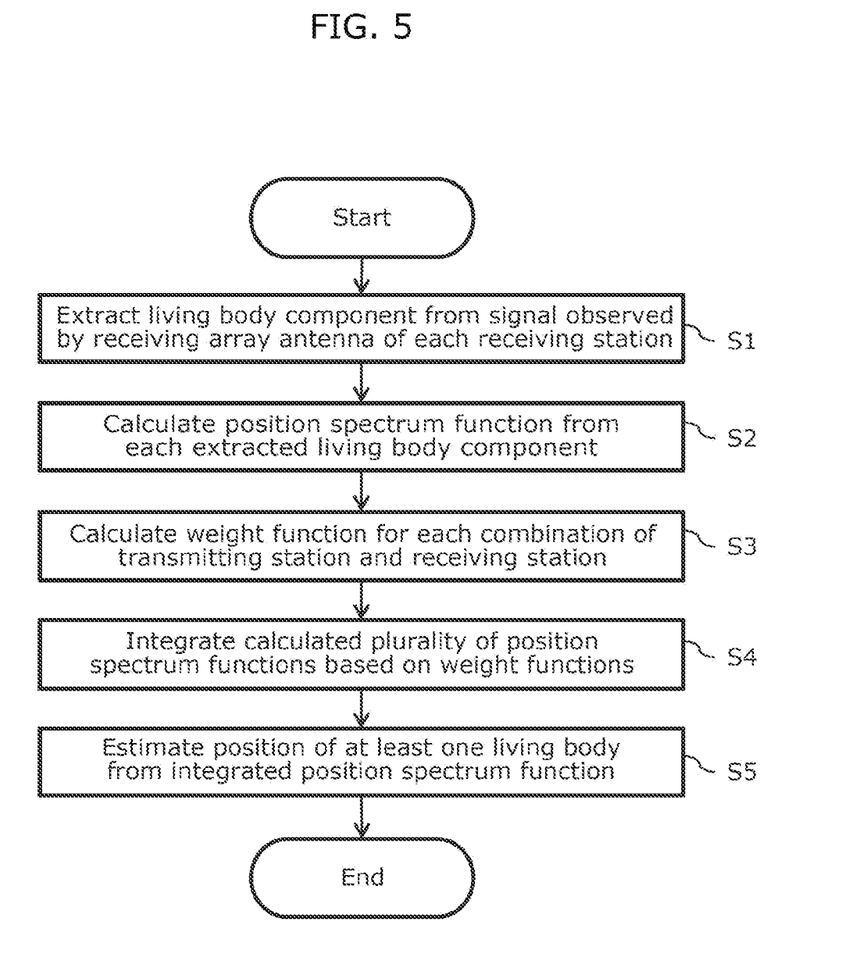
FIG. 5 is a flowchart illustrating a position estimation process by a sensor in the embodiment.
Figure 6:
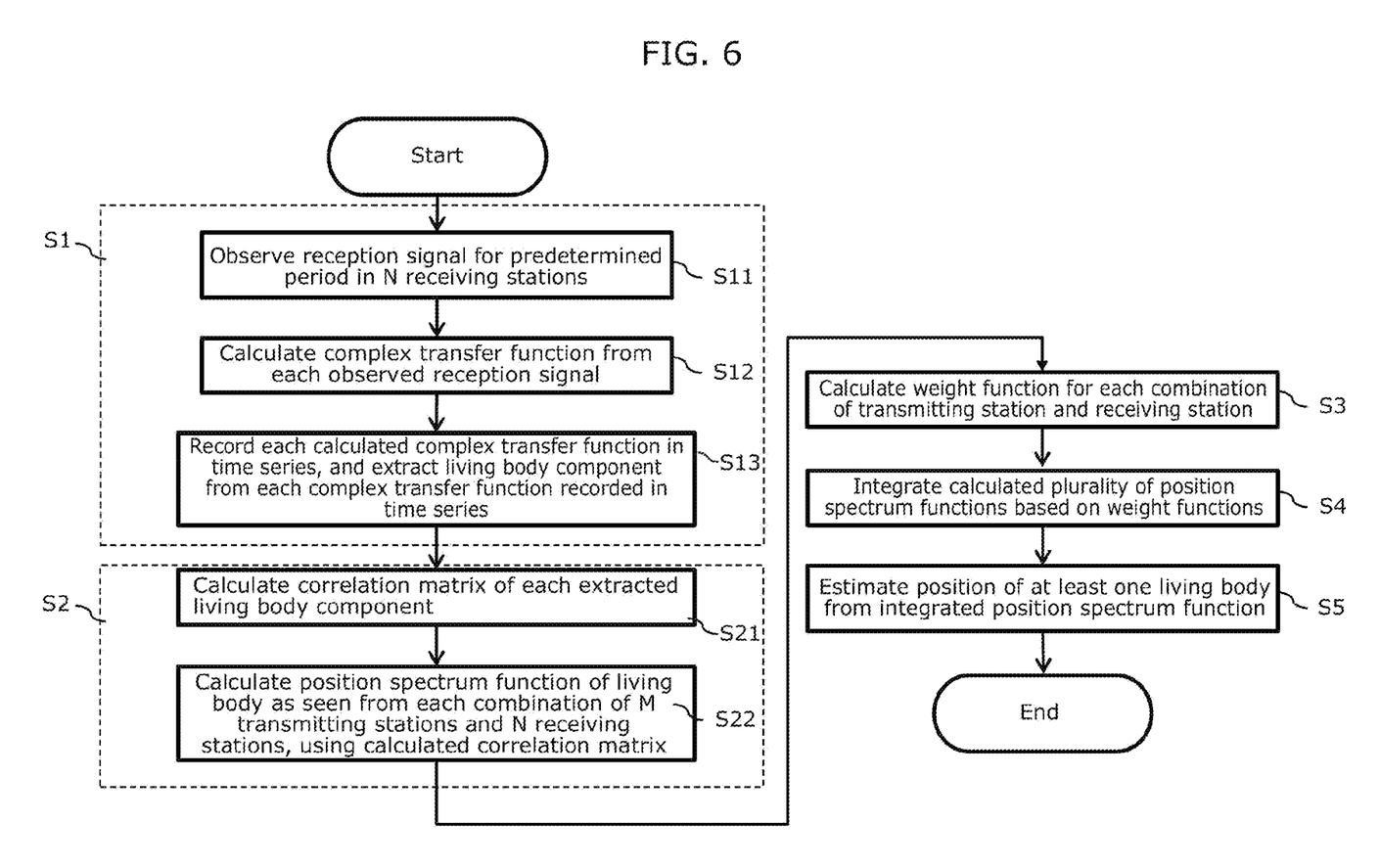
FIG. 6 is a flowchart illustrating the details of the position estimation process illustrated in FIG. 5.

FIG. 5 is a flowchart illustrating a position estimation process by sensor 1 in the embodiment as an example of the present disclosure. FIG. 6 is a flowchart illustrating the details of the position estimation process illustrated in FIG. 5.

First, sensor 1 extracts, from a signal observed by the reception array antenna in each of the plurality of receiving stations 20-1 to 20-N, a living body component that is a signal component transmitted from a transmitting antenna element in transmitting station 10-$j$ from among the M transmitting stations and reflected by at least one living body (Step S1), as illustrated in FIG. 5. More specifically, sensor 1 first observes a reception signal in each of the N receiving stations for a predetermined period (Step S11), as illustrated in FIG. 6.

Sensor 1 then calculates a complex transfer function from the reception signal observed by the reception array antenna in each of the N receiving stations (Step S12). Sensor 1 records the calculated complex transfer functions in a time series, and extracts a living body component from each recorded time-series complex transfer function (Step S13).

Next, sensor 1 calculates, from the living body components extracted in Step S1, (N×M) position spectrum functions that are evaluation functions for the position of at least one living body 100 as seen from the plurality of receiving stations 20-1 to 20-N, where (N×M) is the number of combinations of transmitting stations and receiving stations (Step S2), as illustrated in FIG. 5. More specifically, as illustrated in FIG. 6, sensor 1 first calculates a correlation matrix of each living body component extracted in Step S13 (Step S21). Sensor 1 then calculates the position spectrum function of living body 100 as seen from each of the N receiving stations, using the correlation matrix calculated in Step S21 (Step S22).

Next, sensor 1 calculates a weight function for each of the combinations of the M transmitting stations and the N transmitting stations (Step S3), as illustrated in FIG. 5. The weight function is a function representing the reliability of the position spectrum function, and causes the weight to be smaller when the position is farther from the antenna. Examples of functions usable as the weight function include a Rayleigh distribution and a normal distribution.

Next, sensor 1 integrates the plurality of position spectrum functions calculated in Step S2 into one integrated position spectrum function using the weight functions calculated in Step S3 (Step S4), as illustrated in FIG. 5. More specifically, the integrated position spectrum function is calculated by multiplying each position spectrum function calculated in Step S3 by the weight function of the corresponding combination of the transmitting station and the receiving station calculated in Step S4 and summing the multiplication results for all combinations of the transmitting stations and the receiving stations.

Lastly, sensor 1 calculates at least one maximum value of the integrated position spectrum function calculated in Step S4, to estimate the position of at least one living body 100 (Step S5), as illustrated in FIG. 5.

[Effects, etc.]

With sensor 1 and the position estimation method in this embodiment, the position of a living body can be estimated in a wider range with high accuracy using a wireless signal. Moreover, with sensor 1 and the position estimation method in this embodiment, a plurality of receiving stations are provided to widen the detection range in which a living body is detectable.

More specifically, with sensor 1 and the position estimation method in this embodiment, living body components are extracted from information of complex transfer functions calculated in the plurality of receiving stations, and position spectrum functions calculated from the extracted living body components are integrated to estimate the position of the living body. Thus, the position of the living body can be estimated in a wider range without being affected by obstacles.

For example, even in the case where a signal from a living body as an object is weak and some of the plurality of receiving stations cannot observe reflected waves from the living body, the position of the living body can be estimated using the position spectrum functions obtained from the complex transfer functions in the receiving stations that can observe reflected waves from the living body.

(Variation 1)

Figure 7:
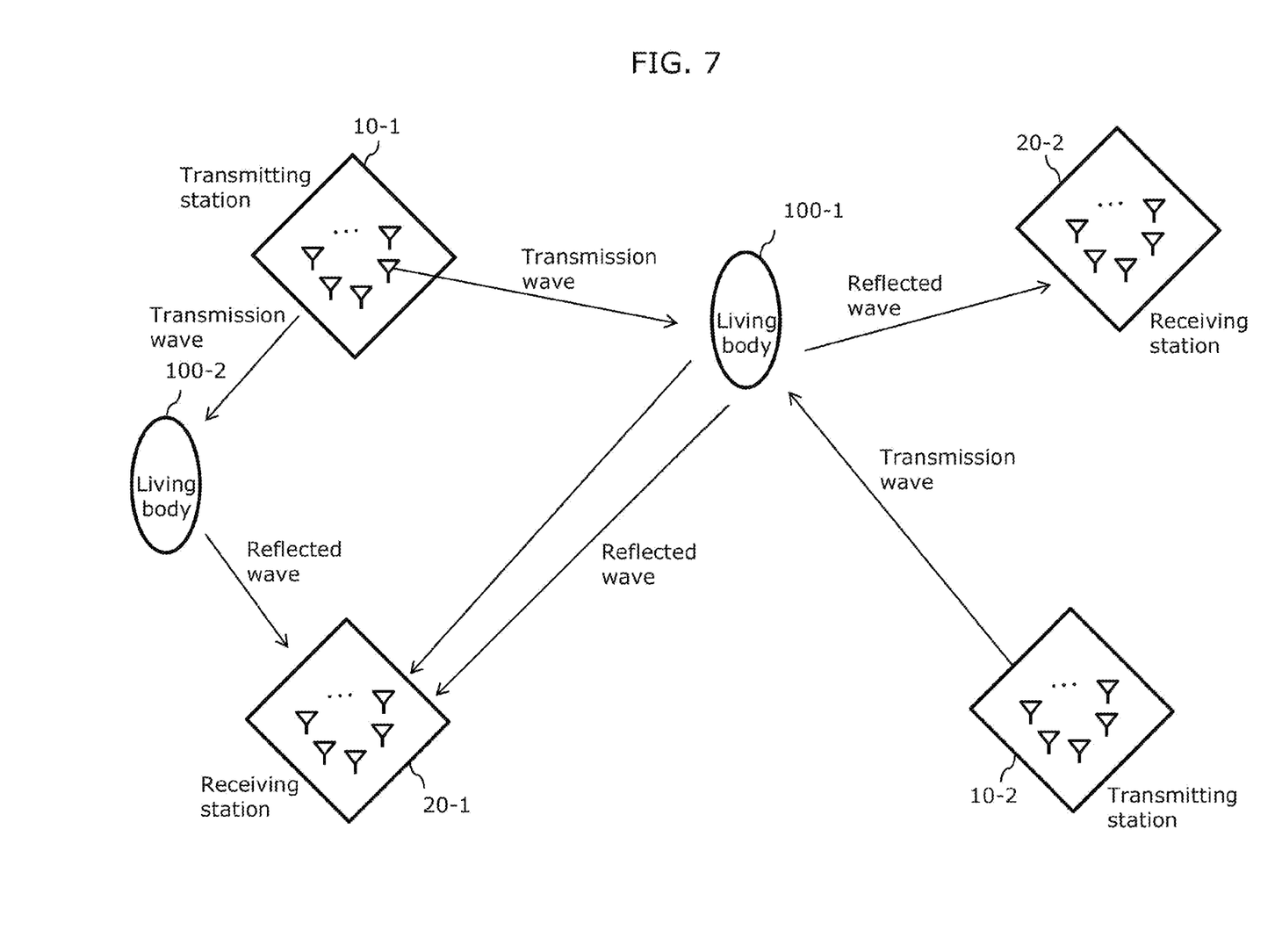
FIG. 7 is a diagram illustrating an example of arrangement of transmitting stations and receiving stations in Variation 1 of the embodiment.

FIG. 7 is a schematic diagram illustrating Variation 1 of the arrangement of sensor 1 in the embodiment. Although the embodiment describes an example in which transmitting antenna 12-$j$ and receiving antenna 21-$i$ are equal-interval array antennas, the antennas used are not limited to equal-interval array antennas. For example, circular arrangement of antenna elements as illustrated in FIG. 7 can make the directivity of the antenna omnidirectional, with it being possible to widen the measurement range of the sensor. Even in the case where a living body is present outside the region surrounded by the antenna as in the case of living body 100-2 in FIG. 7, its position can be estimated correctly.

(Variation 2)

Figure 8:
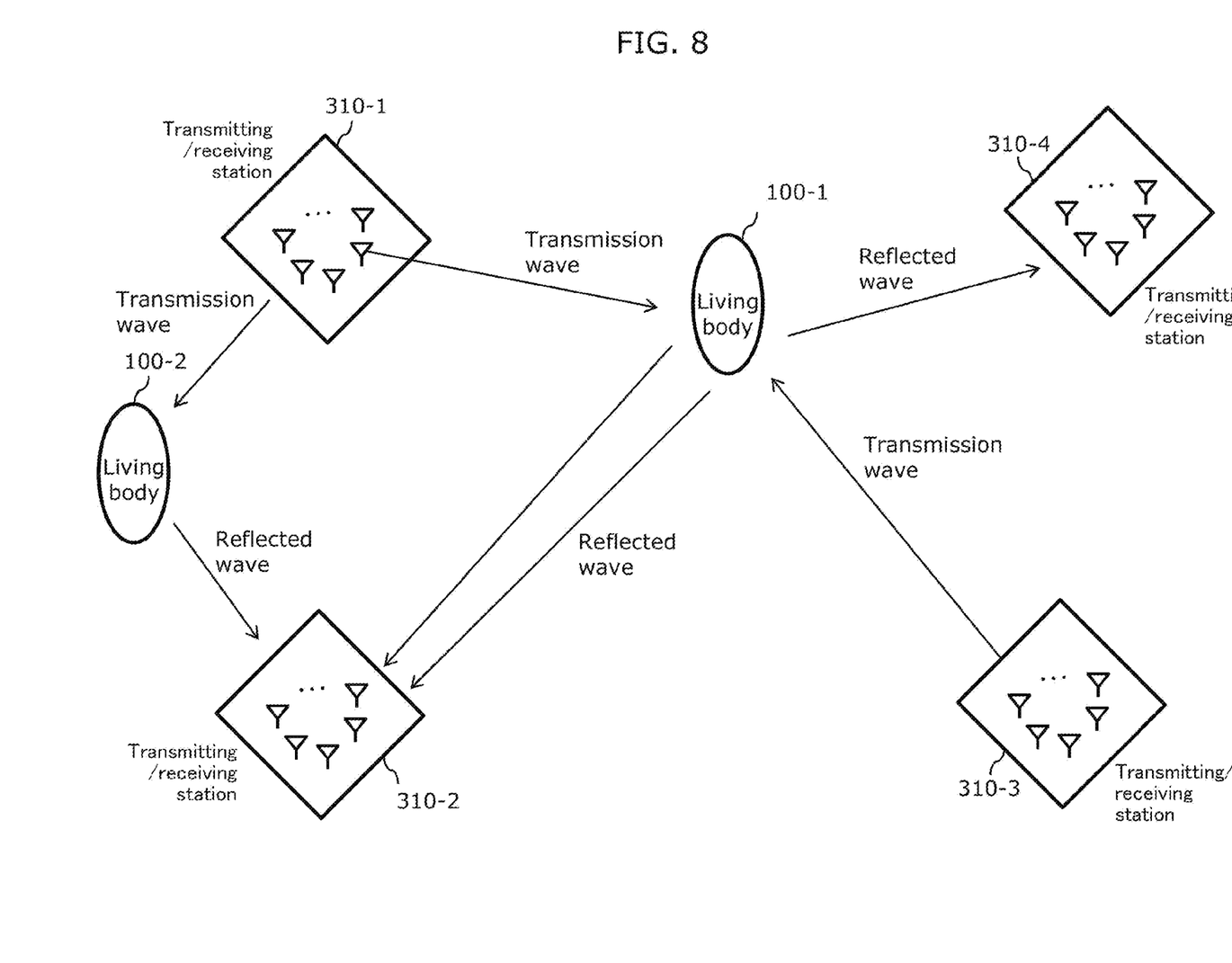
FIG. 8 is a diagram illustrating an example of arrangement of transmitting/receiving stations in Variation 2 of the embodiment.
Figure 9:
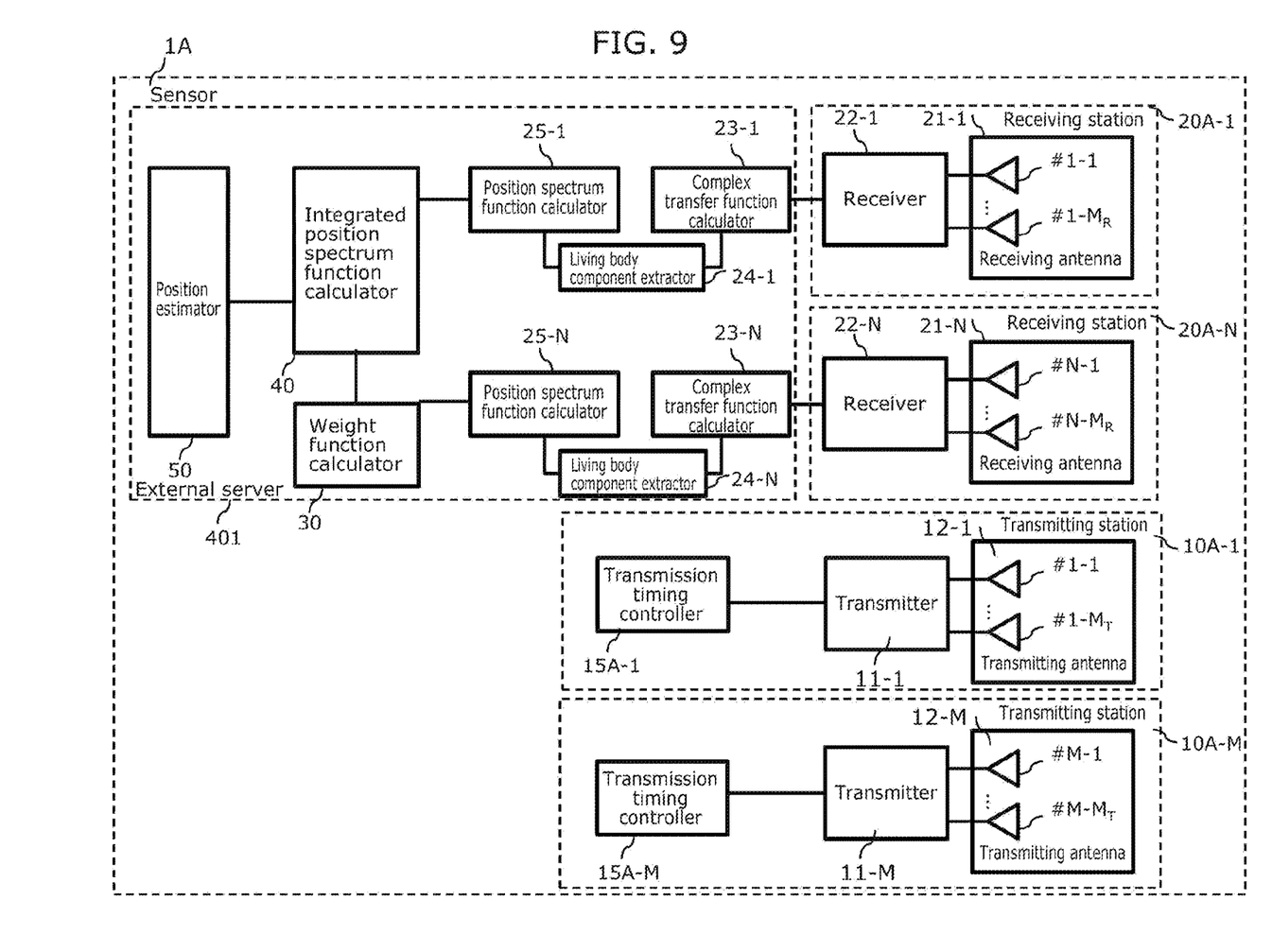
FIG. 9 is a block diagram illustrating an example of a structure of a sensor in Variation 2 of the embodiment.

FIG. 8 is a schematic diagram illustrating Variation 2 of the arrangement of sensor 1 in the embodiment. FIG. 9 is a block diagram illustrating an example of a structure of sensor 1A in Variation 2.

Although the embodiment describes an example in which transmitting antenna 12-$j$ and receiving antenna 21-$i$ are arranged separately, physically the same antenna may be shared so as to arrange transmitting/receiving stations 310-1 to 310-4 as illustrated in FIG. 8. Actual wireless devices often share one antenna as a transmitting antenna and a receiving antenna. Accordingly, this structure enables sensing to be performed using hardware of a wireless device. Moreover, signals transmitted from transmitting/receiving stations 310-1 to 310-4 may be signals used in wireless communication such as a wireless LAN. Although the embodiment describes an example in which one transmission timing controller controls M transmitters, M transmission timing controllers 15A-1 to 15A-M may respectively control transmitters 11-1 to 11-M, as illustrated in FIG. 9.

Each receiving station need not include all of complex transfer function calculator 23-$i$, living body information extractor 24-$i$, and position spectrum function calculator 25-$i$. For example, the receiving station may transmit data to external server 401 to perform calculation in external server 401. Alternatively, position spectrum functions may be transmitted to one receiving station to calculate the integrated position spectrum function in the receiving station.

Each of the structural elements in the foregoing embodiment and variations may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or semiconductor memory. For example, software for realizing the device, etc. according to the foregoing embodiment and variations is the following program.

The program causes a computer to execute a position estimation method executed by a sensor that includes: one or more transmitting stations each including a transmission array antenna that transmits a signal; and one or more receiving stations each including a reception array antenna that receives a signal, the position estimation method including: receiving, by the reception array antenna, a signal transmitted from each of the one or more transmitting stations and influenced by a living body, and extracting a signal component influenced by the living body from the signal received; calculating as many position spectrum functions as a total number of combinations of the one or more transmitting stations and the one or more receiving stations, the position spectrum functions each being calculated from the signal component and corresponding to a likelihood of a position of the living body; calculating as many weight functions as the total number of the combinations of the one or more transmitting stations and the one or more receiving stations, the weight functions each representing reliability of a position spectrum function of a corresponding receiving station at each coordinate in a measurement range; outputting an integrated position spectrum function obtained using the position spectrum functions calculated and the weight functions calculated; and estimating the position of the living body by detecting a maximum value from the integrated position spectrum function.

While a sensor and a position estimation method according to an aspect of the present disclosure have been described above by way of embodiments, the present disclosure is not limited to such embodiments. Other modifications obtained by applying various changes conceivable by a person skilled in the art to the embodiments and any combinations of the structural elements in different embodiments without departing from the scope of the present disclosure are also included in the scope of the present disclosure.

The present disclosure can be realized not only as a sensor including such characteristic structural elements but also as, for example, a position estimation method including steps corresponding to the characteristic structural elements included in the sensor. The present disclosure can also be realized as a computer program for causing a computer to function as the characteristic steps included in the method.

Such a computer program may be distributed via a computer-readable non-transitory recording medium such as CD-ROM or a communication network such as the Internet.

INDUSTRIAL APPLICABILITY

The present disclosure is usable for a sensor and a position estimation method that estimate the position of a living body using a wireless signal, and particularly usable for a sensor and a position estimation method for use in a measurement device that measures the direction or position of a living body, a household electrical appliance that performs control according to the direction or position of a living body, a monitoring device that detects entry of a living body, and the like.

REFERENCE SIGNS LIST 1, 1A sensor
10, 12-1 to 12-M transmitting antenna
10-1 to 10-M, 10A-1 to 10A-M transmitting station
11-1 to 11-M transmitter
15, 15A-1 to 15A-M transmission timing controller
20, 21-1 to 21-N receiving antenna
20-1 to 20-N, 20A-1 to 20A-N receiving station
22-1 to 22-N receiver
23-1 to 23-N complex transfer function calculator
24-1 to 24-N living body component extractor
25-1 to 25-N position spectrum function calculator
30 weight function calculator
40 integrated position spectrum function calculator
50 position estimator
100, 100-1, 100-2 living body
200, 201 region
310-1, 310-2, 310-3, 310-4 transmitting/receiving station
401 external server

The invention claimed is:

1. A sensor comprising:
one or more transmitting stations each including a transmission array antenna that transmits a signal;
one or more receiving stations each including a reception array antenna that receives a signal
a living body component extractor that receives, by the reception array antenna, a signal transmitted from each of the one or more transmitting stations and influenced by a living body, and extracts a signal component influenced by the living body from the signal received;
a position spectrum function calculator that calculates as many position spectrum functions as a total number of combinations of the one or more transmitting stations and the one or more receiving stations, the position spectrum functions each being calculated from the signal component and corresponding to a likelihood of a position of the living body;
a weight function calculator that calculates as many weight functions as the total number of the combinations of the one or more transmitting stations and the one or more receiving stations, the weight functions each representing reliability of a position spectrum function of a corresponding receiving station at each coordinate in a measurement range;
an integrated position spectrum function calculator that outputs an integrated position spectrum function obtained using the position spectrum functions calculated by the position spectrum function calculator and the weight functions calculated by the weight function calculator; and a position estimator that estimates the position of the living body by detecting a maximum value from the integrated position spectrum function.

2. The sensor according to claim 1,
wherein the one or more transmitting stations comprise two or more transmitting stations, or the one or more receiving stations comprise two or more receiving stations.

3. The sensor according to claim 1,
wherein the one or more transmitting stations comprise two or more transmitting stations, and the one or more receiving stations comprise two or more receiving stations.

4. The sensor according to claim 1,
wherein the weight function calculator calculates each of the weight functions based on a positional relationship among the coordinate, the transmission array antenna, and the reception array antenna.

5. The sensor according to claim 1,
wherein the weight function calculator calculates a Rayleigh distribution or a normal distribution as each of the weight functions.

6. The sensor according to claim 1,
wherein the one or more transmitting stations comprise two or more transmitting stations that control transmission timings or transmission frequencies to avoid simultaneous transmission from respective transmission array antennas.

7. The sensor according to claim 1,
wherein the integrated position spectrum function calculator multiplies or adds the position spectrum functions and the weight functions to integrate the position spectrum functions and the weight functions into one function.

8. The sensor according to claim 1,
wherein the position spectrum function calculator calculates the position spectrum functions based on a multiple signal classification (MUSIC) algorithm, a Capon algorithm, or a beamforming algorithm.

9. The sensor according to claim 1,
wherein the weight function calculator calculates each of the weight functions using, as a variable, a value calculated from a sum of a distance between the living body and the transmission array antenna of each of the one or more transmitting stations and a distance between the living body and the reception array antenna of each of the one or more receiving stations.

10. The sensor according to claim 1,
wherein the weight function calculator calculates each of the weight functions using, as the variable, a value calculated by subtracting a distance between the transmission array antenna of each of the one or more transmitting stations and the reception array antenna of each of the one or more receiving stations from the sum of the distance between the living body and the transmission array antenna of each of the one or more transmitting stations and the distance between the living body and the reception array antenna of each of the one or more receiving stations.

11. The sensor according to claim 1,
wherein the weight function calculator calculates each of the weight functions using, as the variable, a value calculated by subtracting a distance between the transmission array antenna of each of the one or more transmitting stations and the reception array antenna of each of the one or more receiving stations from the sum of the distance between the living body and the transmission array antenna of each of the one or more transmitting stations and the distance between the living body and the reception array antenna of each of the one or more receiving stations.

12. The sensor according to claim 1,
wherein the integrated position spectrum function calculator integrates the position spectrum function by calculating a sum total of products of the weight functions and the position spectrum function, and outputs the integrated position spectrum function.

13. A position estimation method executed by a sensor that includes: one or more transmitting stations each including a transmission array antenna that transmits a signal; and one or more receiving stations each including a reception array antenna that receives a signal, the position estimation method comprising:
receiving, by the reception array antenna, a signal transmitted from each of the one or more transmitting stations and influenced by a living body, and extracting a signal component influenced by the living body from the signal received;
calculating as many position spectrum functions as a total number of combinations of the one or more transmitting stations and the one or more receiving stations, the position spectrum functions each being calculated from the signal component and corresponding to a likelihood of a position of the living body;
calculating as many weight functions as the total number of the combinations of the one or more transmitting stations and the one or more receiving stations, the weight functions each representing reliability of a position spectrum function of a corresponding receiving station at each coordinate in a measurement range;
outputting an integrated position spectrum function obtained using the position spectrum functions calculated and the weight functions calculated; and
estimating the position of the living body by detecting a maximum value from the integrated position spectrum function.

14. The position estimation method according to claim 13,
wherein each of the weight functions is calculated using, as a variable, a value calculated based on a sum of a distance between the living body and the transmission array antenna of each of the one or more transmitting stations and a distance between the living body and the reception array antenna of each of the one or more receiving stations.

15. The position estimation method according to claim 13,
wherein each of the weight functions is calculated using, as the variable, a value calculated by subtracting a distance between the transmission array antenna of each of the one or more transmitting stations and the reception array antenna of each of the one or more receiving stations from the sum of the distance between the living body and the transmission array antenna of each of the one or more transmitting stations and the distance between the living body and the reception array antenna of each of the one or more receiving stations.

16. The position estimation method according to claim 13,
wherein each of the weight functions is calculated using, as the variable, a value calculated by subtracting a distance between the transmission array antenna of each of the one or more transmitting stations and the reception array antenna of each of the one or more receiving stations from the sum of the distance between the living body and the transmission array antenna of each of the one or more transmitting stations and the distance between the living body and the reception array antenna of each of the one or more receiving stations.

17. The position estimation method according to claim 13, wherein the position spectrum function is obtained by calculating a sum total of products of the weight functions and the position spectrum function.

* * * * *